United States Patent [19]
Kvifte et al.

[11] Patent Number: 5,371,640
[45] Date of Patent: Dec. 6, 1994

[54] DATA CARRIER LOAD/REPLACE BELT SYSTEM FOR A DATA CARRIER LOADER

[75] Inventors: Halvor O. Kvifte, Haslum; Guttorm Rudi, Fjellhamar; Arnulf Aannestad, Honefoss; Ole C. Tronrud, Sokna, all of Norway

[73] Assignee: Tandberg Data Storage A/S, Oslo, Norway

[21] Appl. No.: 58,031

[22] Filed: May 7, 1993

[51] Int. Cl.$^5$ ............................................. G11B 15/68
[52] U.S. Cl. ........................................................ 360/92
[58] Field of Search ................. 360/92, 98.06; 369/34, 369/36, 178, 191; 414/932

[56] References Cited

U.S. PATENT DOCUMENTS

| | | | |
|---|---|---|---|
| 4,489,355 | 12/1984 | Rudi | 360/96.5 |
| 4,910,619 | 3/1990 | Suzuki et al. | 360/92 |
| 4,911,506 | 3/1990 | Stefan | 312/16 |
| 5,274,516 | 12/1993 | Kakuta et al. | 360/92 |

FOREIGN PATENT DOCUMENTS 1-205755  8/1989  Japan .
1-296452  11/1989  Japan .
2-96965  4/1990  Japan .

Primary Examiner—Robert S. Tupper
Attorney, Agent, or Firm—Hill, Steadman & Simpson

[57] ABSTRACT

A belt system is disclosed for transferring a data carrier between a magazine and a data reader for use in a data carrier loader of the type wherein the data reader is moved, within the loader housing, over the stationary magazine in the housing to transfer a data carrier therebetween. The belt system includes two belt assemblies, which are carried on the data reader and which are disposed for engaging opposite lateral sides of a data carrier in the magazine. A mechanical linkage is provided for moving the assemblies toward and away from the lateral sides of the data carrier, the linkage being a reciprocating linkage which can be moved in either direction by means of an internally threaded element, which engages a pivotable element of the linkage, the internally threaded element being moved by a rotating threaded rod received therein. When the belt assemblies engage the data carrier, the belt is rotated in a selected direction either to lift the data carrier from the magazine into the reader or to remove the data carrier from the reader and replace it in the magazine.

10 Claims, 6 Drawing Sheets

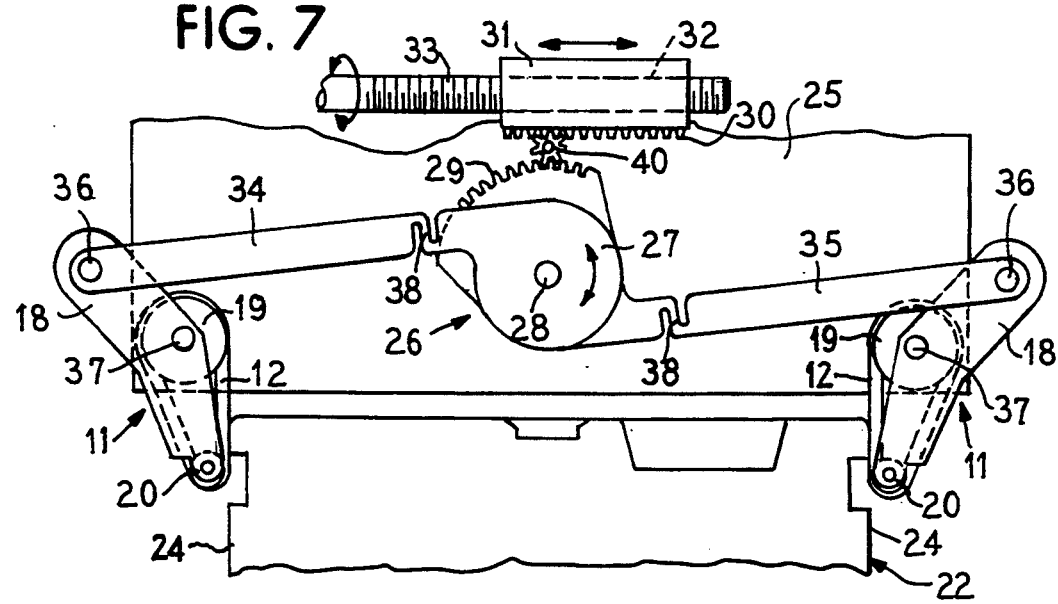
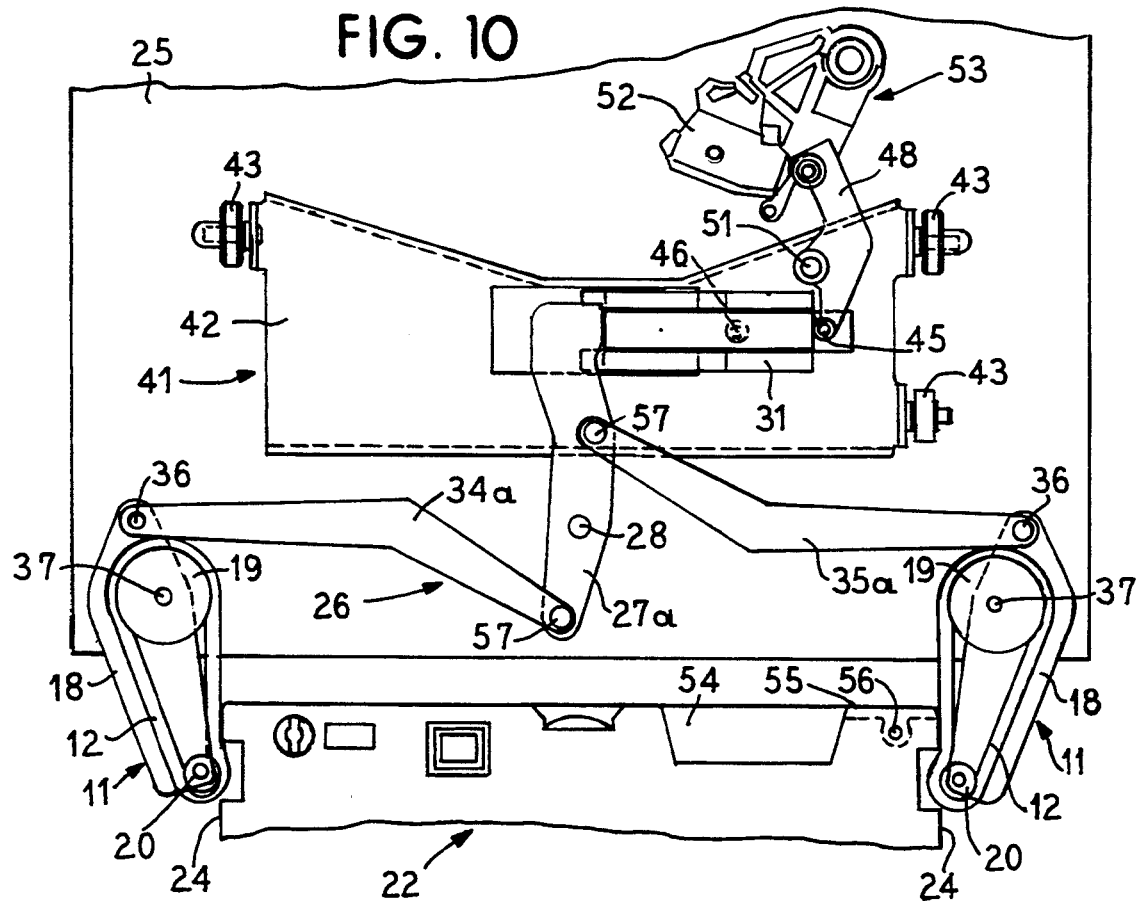

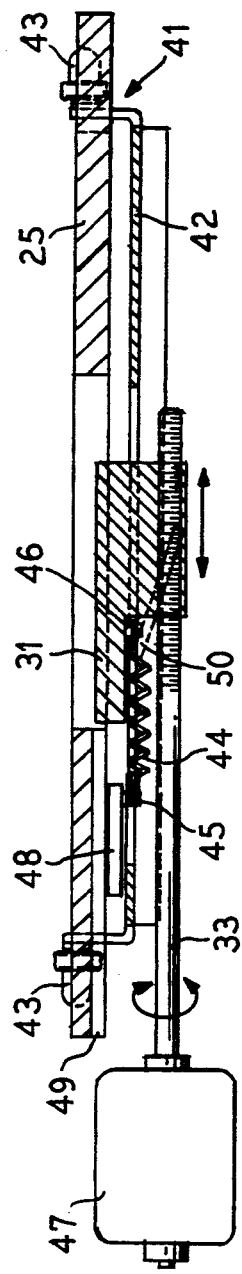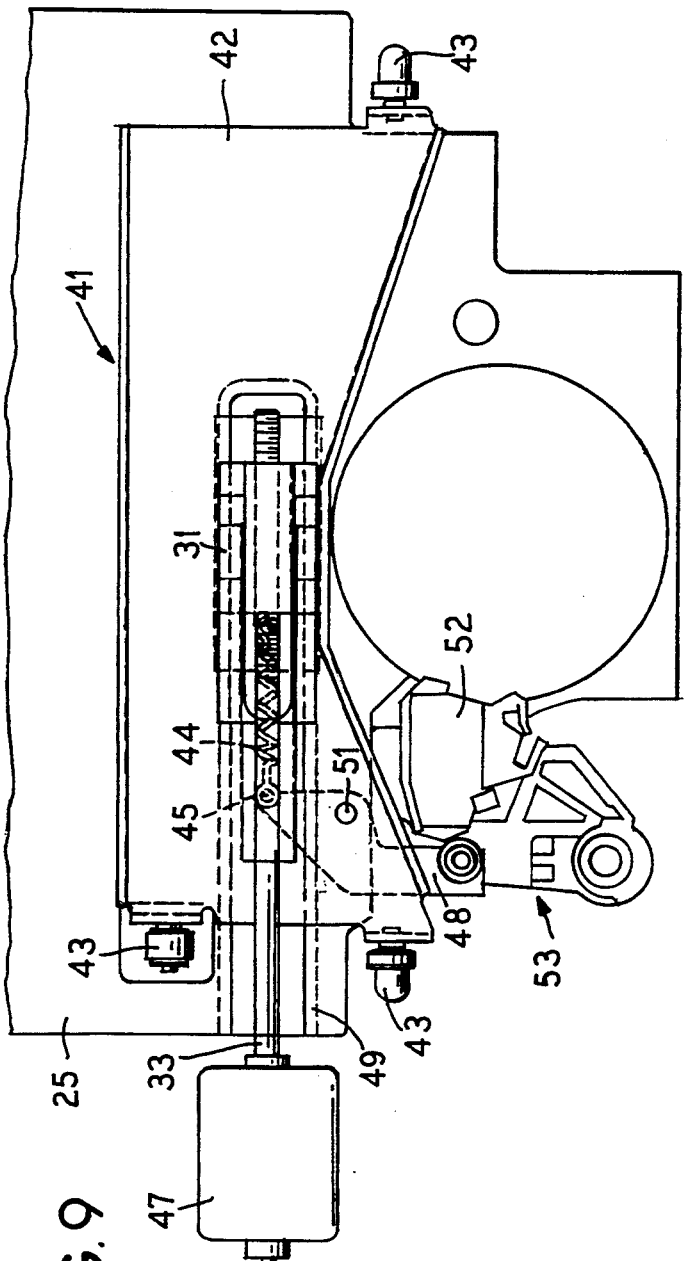
FIG. 8
FIG. 9

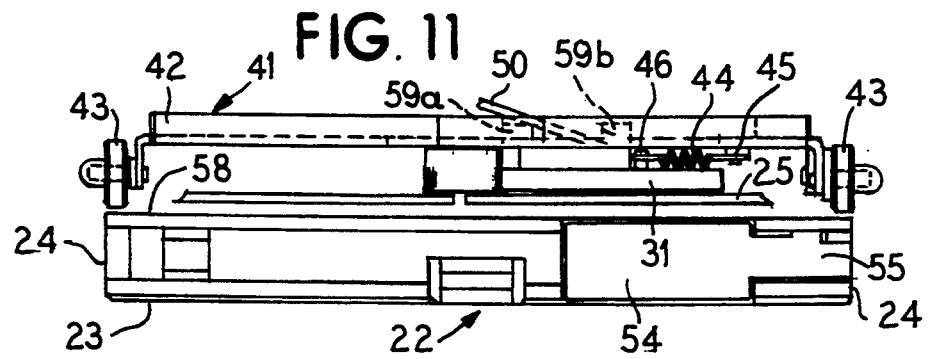
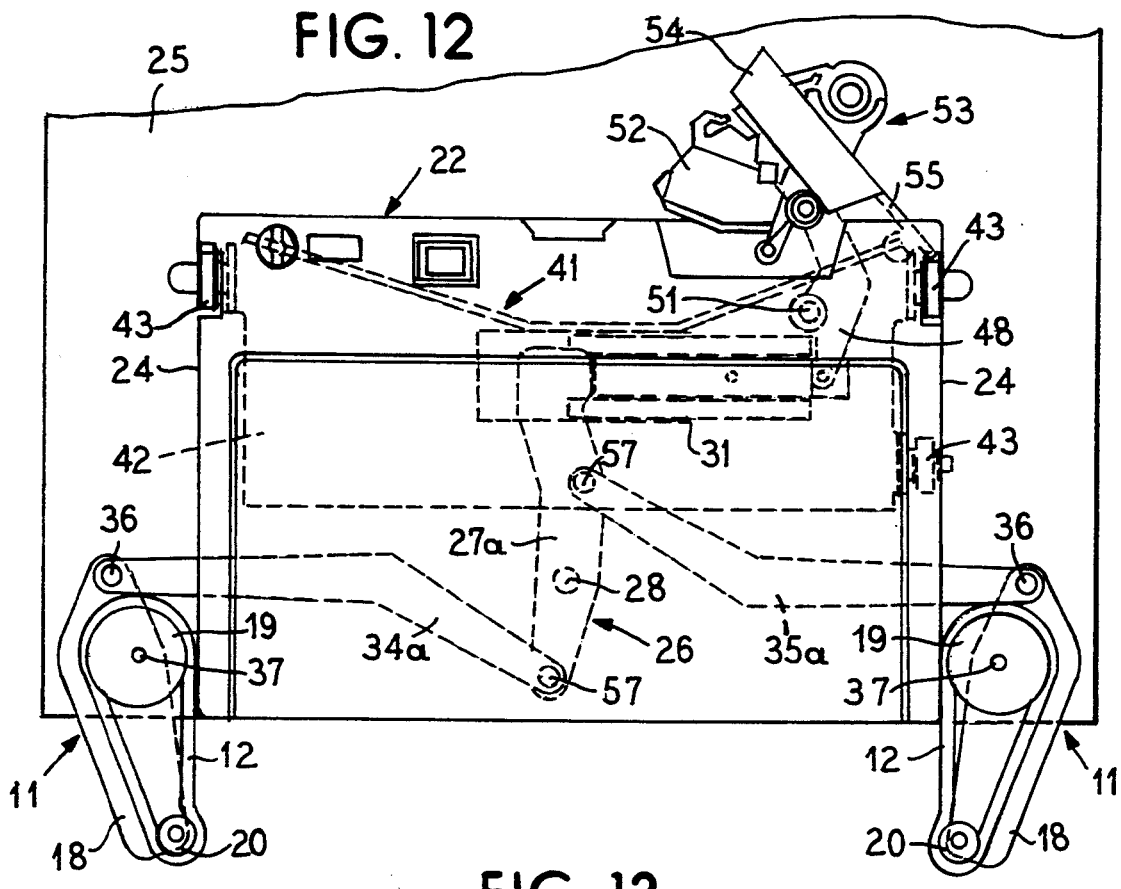
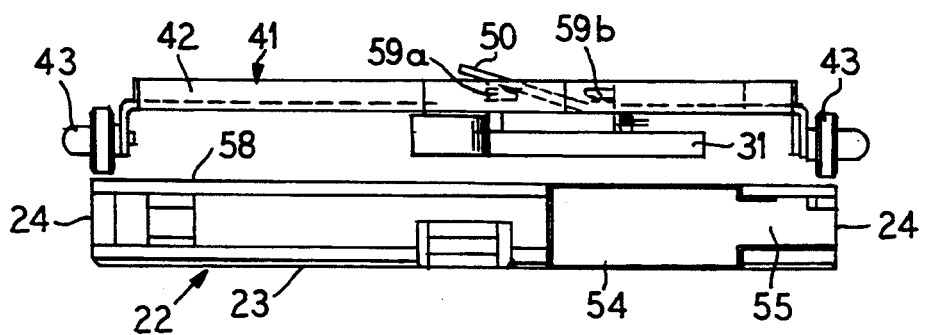

DATA CARRIER LOAD/REPLACE BELT SYSTEM FOR A DATA CARRIER LOADER

BACKGROUND OF THE INVENTION

1. Field of the Invention

The present invention is directed to loaders for data carriers of the type wherein a magazine containing a plurality of data carriers is inserted into a loader housing, and a data reader is moved over the magazine to select a data carrier therefrom for insertion into the reader, and in particular to a belt system for loading a data carrier from the magazine into the reader, and thereafter replacing the data carrier in the magazine.

2. Description of the Prior Art

It is known to record and store data on a number of different types of storage media, such as magnetic tape, optical disks and the like. Because of the limited size of such data carriers, the amount of data which can be stored thereon is similarly limited. In computing and data retrieval systems wherein a large amount of data is stored, a relatively large number of such data carriers are required in order to contain all of the necessary data. To retrieve the data from the data carrier, it is necessary to insert the carrier into a data reader, such as a tape drive unit. (As used herein, the unit into which the data carrier is inserted will be referred to as a "reader," although it may also be used for the purpose of writing data on the carrier.)

In systems requiring multiple data carriers, it is cumbersome to manually successively insert and remove the data carriers from the reader. Many such systems, therefore, employ a data carrier magazine, which holds a large number of data carriers, with the magazine being loadable into a device which contains the reader. A selected data carrier can then be automatically removed from the magazine, and automatically inserted into the reader wherein the data on the carrier is read, or new data is written on the carrier. After completion of the read or write operation, the data carrier is then automatically removed from the reader and is replaced in the magazine. The overall unit, which includes the magazine, the data reader, and an automated mechanism for removing the data carrier from the magazine, inserting it into the reader, and removing it from the reader and replacing it in the magazine, is generically known as a "loader." Loaders can generally be classified into three types: Those in which the magazine is stationary in the loader and the drive is moved over the magazine to the position of a selected data carrier in the magazine, those wherein the reader is stationary and the magazine is moved to position a selected data carrier at a location for insertion in the reader, and those wherein both the magazine and reader are stationary, and an "elevator" or other type of data carrier transfer mechanism is used to move the selected data carrier from the magazine, transport it to, and insert it in the reader. Various combinations of these three basic types of units are also known.

A loader of the first type, wherein a plurality of data carriers, such as magnetic tape cartridges, are contained in a stationary magazine, and a tape drive unit is moved over the magazine to a position above a selected tape cartridge, is described in Japanese Patent 2-96965. In this known device, transfer of the tape cartridge from the magazine into the reader takes place by means of a mechanism which is carried by the tape drive unit and which extends below the magazine. Each cartridge receptacle in the magazine has an opening in a bottom thereof, and the mechanism carried by the tape drive unit has a rotatable threaded rod connected to a lifting element which is disposed in registry with the opening for a receptacle when the tape drive unit is positioned above that receptacle. Rotation of the threaded rod causes the lifting element to project into the opening, thereby pushing the tape cartridge upwardly out of the magazine and into the tape drive unit, at least to a sufficient extent to permit mechanics within the tape drive unit to engage the tape cartridge.

Another type of transfer mechanism for cassettes is described in Japanese Patent 1-205755. That patent discloses a cassette insertion and removal mechanism for use in a video cassette lending machine, wherein the cassette is gripped on opposite sides by respective roller-driven belts. The belts frictionally engage the cassette, and when moved by respective driven rollers about which the belts are entrained, a cartridge is removed from a location on a storage shelf. The mechanism can be operated in reverse for replacing the cassette on the storage shelf.

SUMMARY OF THE INVENTION

It is an object of the present invention to provide a data carrier loader of the type wherein a data reader is moved in a housing over a stationary data carrier magazine, and wherein a data carrier is transferred between the magazine and the reader by rotating belts disposed on opposite sides of the data carrier, which includes an automatically operated mechanical linkage for engaging and disengaging the belts with the sides of the data carrier.

It is a further object of the present invention to provide such a mechanical linkage which can be easily combined with a data reader, for mounting thereon, with a minimum of interference with the other functions of the data reader.

The above objects are achieved in accordance with the principles of the present invention in a data carrier loader of the type wherein a data reader is moved in a housing over a stationary carrier magazine containing a plurality of data carriers, wherein two belt assemblies are carried on opposite sides of the data reader so as to be movable into engagement with lateral sides of a data carrier in the magazine, and wherein a mechanical linkage is connected to the two belt assemblies for moving them simultaneously toward or away from the data carrier, the linkage being a reciprocating linkage which can be moved in either direction by an internally threaded element, operated by a rotating threaded rod.

The belt assemblies can be mounted on a support plate which is a part of, or is carried with, the data reader as it moves over the data carrier magazine in the loader housing. The linkage is formed by a central rotatable element, also mounted on the support plate, with two arms extending at opposite sides thereof, respectively pivotably attached to the belt assemblies. The central element carries means thereon for mechanically engaging the internally threaded element. This means for engaging may be formed by a projection which is abutted by the internally threaded element, teeth on the rotatable element which engage a rack on the internally threaded element, or a toothed wheel disposed between the internally threaded element and the rotatable element, with the rotatable element carrying teeth engaging the wheel and the internally threaded element having a rack engaging the wheel.

If the data carrier is in the form of a magnetic tape cartridge, the internally threaded element can also serve as an actuator for components within the data reader collectively known as cartridge lock mechanics. These components move the cartridge within the reader to a selected, specified position relative to the write/read head, and fix the cartridge in that position for the reading and writing of data. The structure and operation of the cartridge lock mechanics, by itself, does not constitute a part of the present invention, and may be as known and described, for example, in U.S. Pat. No. 4,489,355. The cartridge lock mechanics known from this patent are operated by a lever movable between two positions, which can be replaced by the internally threaded element disclosed herein, which is movable in opposite directions along the aforementioned threaded rod, dependent on the direction of rotation of the threaded rod.

The mechanical linkage may consist of metallic or plastic components. Whether metallic or plastic, the components of the linkage can be connected at articulated locations by pivot pins joining the two components which must be articulated. If the components, or at least the rotatable element and the arms extending therefrom, consist of plastic, the articulation between the arms and the rotatable element can be regions of reduced width, respectively disposed between the rotatable element and the arms, which are sufficiently flexible, due to the material consisting of plastic, to provide the necessary articulation.

DESCRIPTION OF THE DRAWINGS

FIG. 7 shows a third embodiment of a mechanical linkage for operating the belt assemblies constructed in accordance with the principles of the present invention.

FIG. 8 shows the elements for moving the internally threaded element constructed in accordance with the principles of the present invention, partly in section.

FIG. 9 shows the elements of FIG. 8 together with certain elements of the cartridge lock mechanics.

FIGS. 10, 12, and 14 show a loading sequence with a fourth embodiment of a mechanical linkage for operating the belt assemblies constructed in accordance with the principles of the present invention, together with certain components of the cartridge lock mechanics.

FIGS. 11, 13 and 15 respectively show plan views of the sequence of FIGS. 10, 12 and 14.

DESCRIPTION OF THE PREFERRED EMBODIMENT

Figure 1:
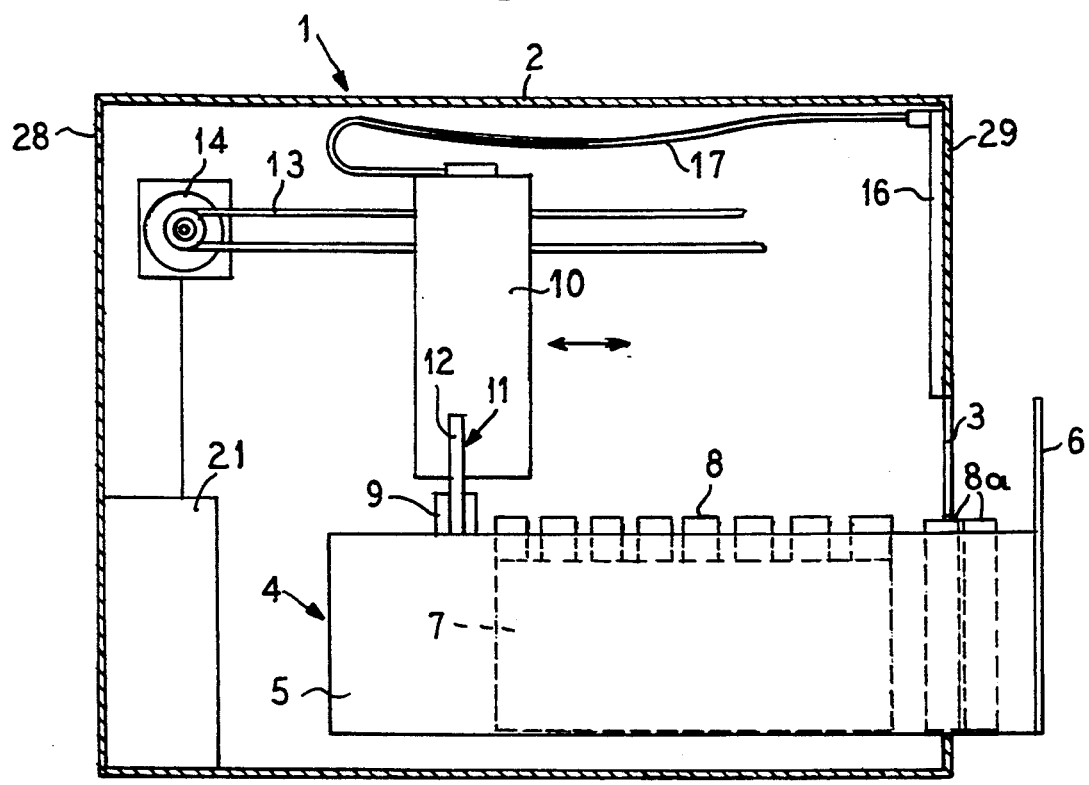
FIG. 1 is a side sectional view of a data carrier loader constructed in accordance with the principles of the present invention, with the components therein being schematically indicated.

A loader 1 constructed in accordance with the principles of the present invention is shown in sectional view in FIG. 1, with the components therein necessary for explaining the principles of the present invention being schematically indicated. The loader 1 has a central housing section 2, which forms the top, bottom and sides of the housing, to which a rear panel 28 and a front panel 29 are attached. The front panel 29 has an opening 3 therein, for accommodating a drawer assembly 4. The drawer assembly 4 includes a drawer body 5, and a drawer front 6 which, when the drawer assembly 4 is fully introduced into the loader 1, closes the opening 3. The drawer assembly 4 is movable into and out of the loader 1 in the direction of the double arrow shown in FIG. 1, i.e., along the longitudinal extent of the drawer assembly 4. The drawer assembly 4 is movable on suitable supports and rollers in the housing 1 (not shown).

The drawer body 5 is adapted to receive a magazine 7 which contains a plurality of data carriers 8, such as magnetic tape cartridges. The data carriers 8 can be manually inserted into the magazine 7 at a location remote from the loader 1, at which a plurality of such loaded magazines 7 can be stored. A selected magazine is then placed in the drawer assembly 4 for insertion into the loader 1.

The drawer assembly 4 also includes space for accommodating separate data carriers 8a, which may remain in the drawer body 5 at all times, independently of the insertion and removal of the magazine 7. The data carriers 8a may, for example, be a cleaning cartridge and a "mail slot" cartridge. When a data carrier 8 is to be removed from the magazine 7 in the drawer body 5 for insertion into a data reader 10, the data reader 10 is moved by means of a belt 13 operated by a motor 14 along the direction of the double arrow, until the reader 10 comes to be positioned above the selected data carrier 8. This is accomplished automatically under commands from control circuitry carried on a circuit board 16, and connected to the data reader 10 via a flexible cable 17. Positioning of the data reader 10 ensues in a known manner either under the control of a program, or under manual control. The motor 14 is connected to a power supply 21, which may also supply power to other components via further supply lines (not shown).

When the data reader 10 is positioned above a selected carrier 8, the data carrier 8 must be lifted from the magazine 7 into the data reader 10. This is accomplished by data carrier transfer/drawer engaging assemblies 11, mounted on opposite sides of the data reader 10, which also serve the purpose, as described below, of engaging the drawer assembly 4. Each assembly 11 has a rubber belt 12 thereon which is entrained around two rotatable wheels 19 and 20, mounted on an assembly plate 18. For lifting a data carrier 8 out of the magazine 7 disposed in the drawer body 5, the assemblies 11 are rotated toward the sides of the data carrier 8 by a linkage mechanism, several embodiments of which are described below. When the rubber belts 18 come into contact with the lateral sides of the data carrier 8, the wheel 19 is caused to be rotated in a direction so that the now-vertical portions of the belts 12 are moving upwardly, thereby lifting the carrier 8 out of the magazine 7 and carrying it into the data reader 10. The assemblies 11 are mounted on a support plate 10a, which is a part of the data reader 10. The wheels 19 can be rotated in any suitable manner, such as by a small motor carried beneath or inside the wheel 19, or by suitable gearing from a separate motor. The operation of the motor of which rotates the wheel 19 at the appropriate time is undertaken by a command from the circuit board 16 via a suitable signal line (not shown).

As shown in FIG. 1, the assemblies 11 are also used to engage the drawer assembly 4, thereby permitting the drawer assembly 4 to be pulled into and pushed out of the loader 1 by the same motor 14 which is used to move the data reader 10. A separate motor and driving linkage exclusively dedicated for moving the drawer assembly 4 is thus avoided. For this purpose, the drawer assembly 4 carries a pair of engagement elements 9 at a rear thereof, mounted on the drawer body 5. Each engagement element 9 is formed by a block having a recess therein.

As shown in FIG. 1, each assembly 11 is laterally movable so that the end thereof at which the wheel 20 is disposed is received into the recess in the engagement element 9, thereby creating a positive mechanical linkage from the drawer assembly 4 to the motor 14 via the guide elements 9, the assemblies 11, the data reader 10 and the belt 13. The motor 14 is then operated to move the drawer assembly 4 into or out of the housing 2, depending upon whether the loader 1 is at a beginning or an end of its operating command sequence. If the drawer assembly 4 is being moved into the housing 2, in which case one or more data carriers 8 will thereafter be removed from the magazine 7 and inserted in the data reader 10, the assemblies 11 are disengaged from the engagement elements 9, as shown in FIG. 3, so that the data reader 10 is free to move along the data carriers 8 in the magazine so as to be positionable over a selected one of those data carriers 8.

After the last data carrier 8 from which data has been read is replaced into the magazine 7 by the assemblies 11, the data reader 10 is again moved to a position above the engagement elements 9 and the assemblies 11 re-engage the engagement elements 9 so that the drawer assembly 4 is pushed out of the housing 2. Since the engagement elements 9 are disposed at the rear of the drawer assembly 4, the drawer assembly 4 can be partially moved out of the housing 2 a sufficient distance by moving the data reader 10 to its extreme position at the right of FIG. 1. At this position, enough of the drawer assembly 4 is outside of the housing 2 so that the magazine 7 can be removed from the drawer body 5 and, if desired, a new magazine 7 can be inserted therein. The assemblies 11 remain engaged with the engagement elements 9, so that when it is desired to again move the drawer assembly 4 into the loader 1, these components will already be engaged.

Figure 4:
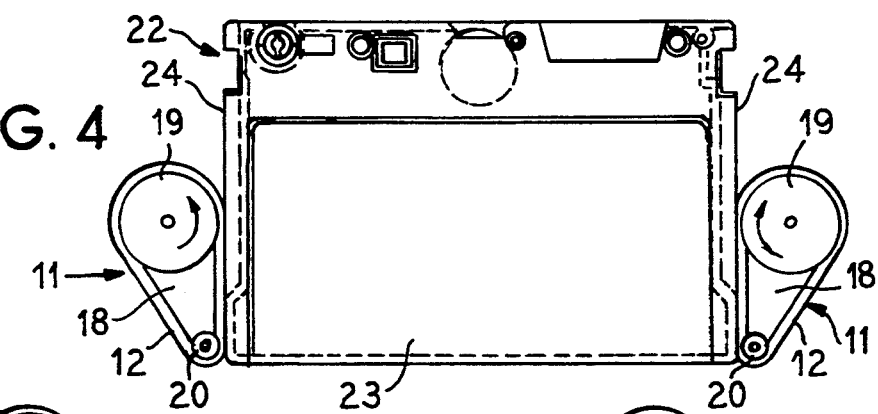
FIGS. 2, 3 and 4 schematically show a loading sequence of a data carrier relative to the belt assemblies in the loader of FIG. 1.
Figure 3:
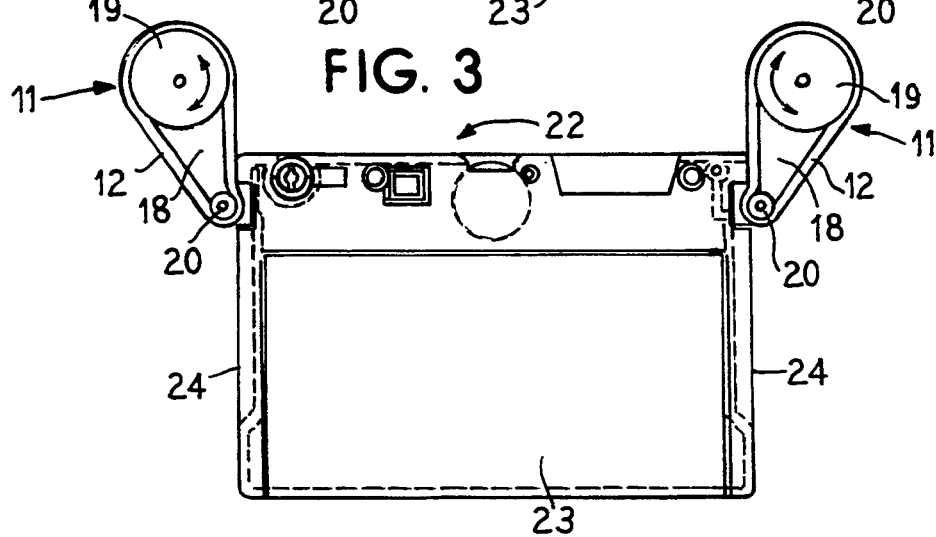
Figure 2:
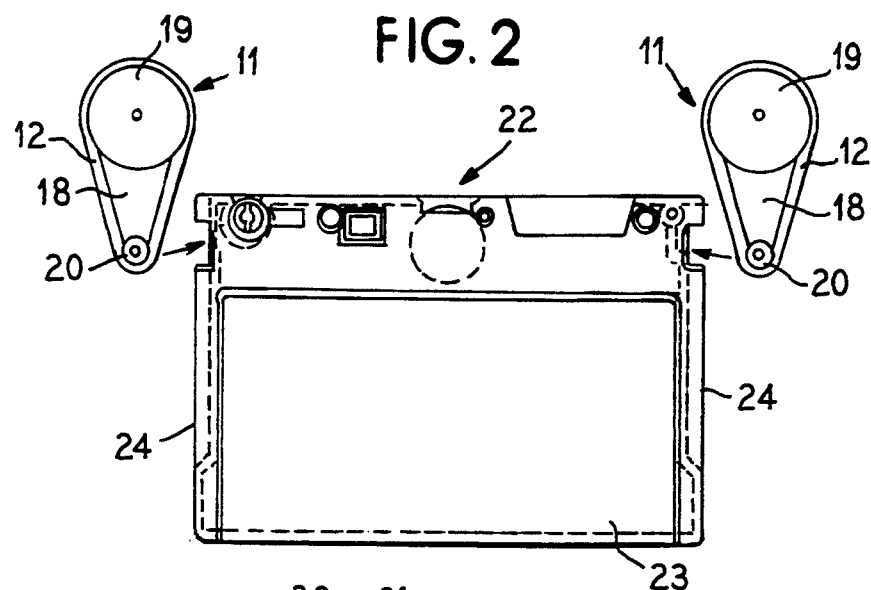

A sequence for transferring a data carrier in the form of a magnetic tape cartridge 22 from the magazine 7 in the loader 1 into the data reader 10 is shown in FIGS. 2, 3 and 4. In those figures, the magazine 7 and other surrounding components have been omitted for clarity. The tape cartridge 22 has a front face 23 (and an opposite rear face 58 visible in other figures) and lateral sides 24. The cartridge 22 will be considered to be in an upright position when the lateral sides 24 are substantially vertically oriented. As indicated by the arrows, the assemblies 11 are caused to rotate about the axis of the wheel 19 so that the belt 12 of each assembly 11 comes into frictional engagement with the lateral sides 24, as shown in FIG. 3. The rotation of the assemblies 11 toward the lateral sides 24 of the tape cartridge 22 is effected by a mechanical linkage, described in more detail below.

When the assemblies 11 are positioned as shown in FIG. 3, each wheel 19 of each assembly 11 is caused to rotate in the direction indicated by the arrows, so that each belt 12 rotates around each wheel 19, thereby causing the tape cartridge 22 to move upwardly by frictional engagement with the belts 12, as shown in FIG. 4, into the data reader 10.

The sequence takes place in reverse when the tape cartridge 22 is to be removed from the data reader 10 and replaced into the magazine 7.

As noted above, the data reader 10 is positioned above a tape cartridge 22 to be removed from the magazine 7 by means of the motor 14 and the belt 13. If, instead, it is desired to move the drawer assembly 4 out of the loader 1, the data reader 10 is positioned above the engagement elements 9, instead of above a tape cartridge 22, and the assemblies 11 are caused to execute the movement shown in FIG. 2, but toward the engagement elements 9 instead of toward a tape cartridge 22.

Rotation of the wheels 19 to lift a data carrier 8 from the magazine 7 into the data reader 10, and in the opposite direction to replace the data carrier 8 into the magazine 7, can be accomplished by any suitable means, such as a motor contained within or disposed beneath each wheel 19, or by a suitable mechanical linkage to a motor disposed at a different location. Rotation of the wheels 19 takes place at the proper chronological location within a sequence under the control of the circuitry 16.

Figure 5:
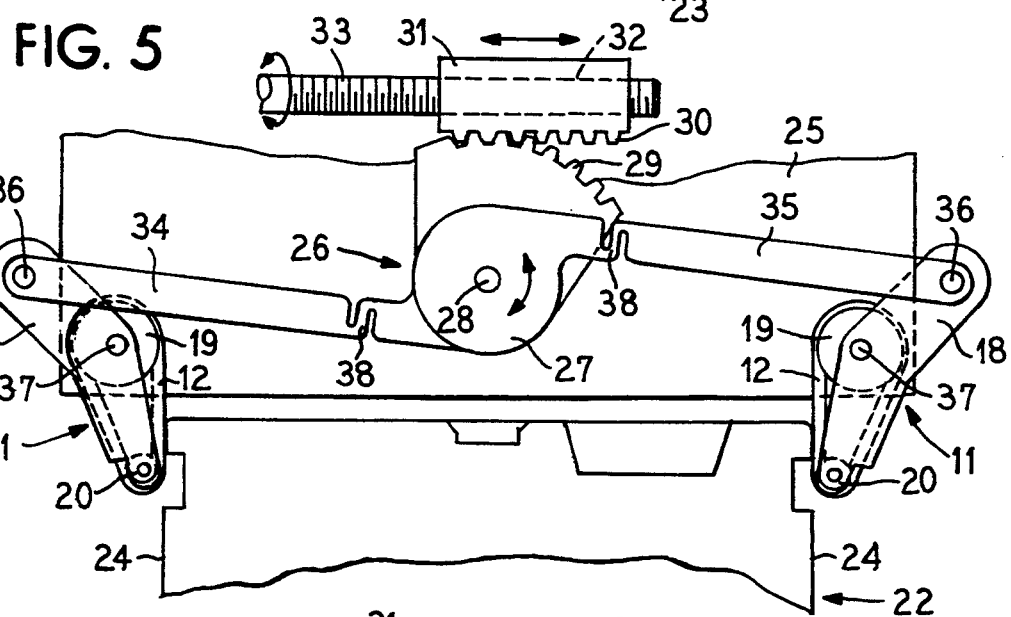
FIG. 5 shows a first embodiment of a mechanical linkage for operating the belt assemblies constructed in accordance with the principles of the present invention.
Figure 6:
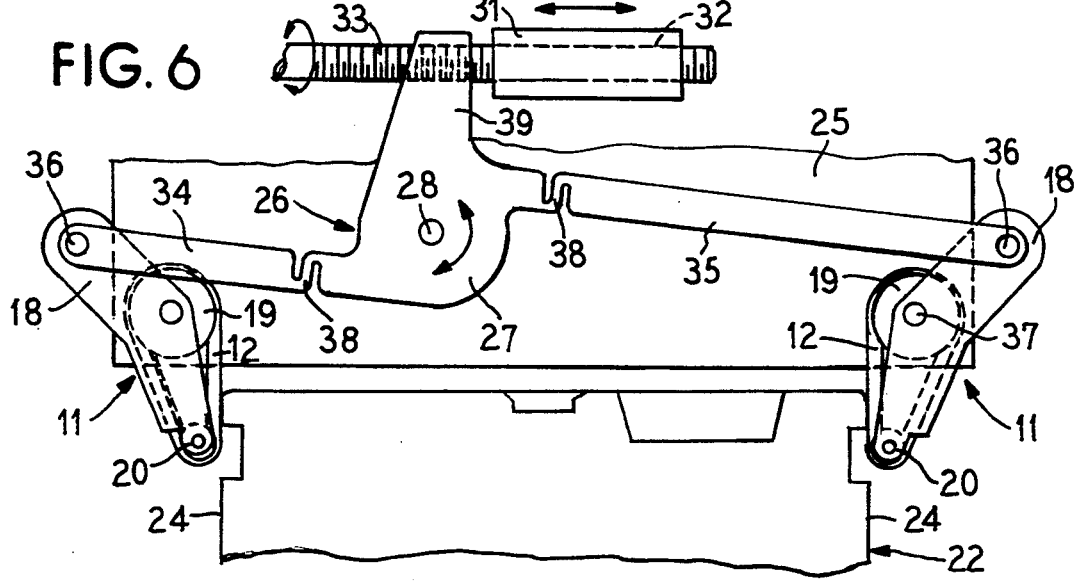
FIG. 6 shows a second embodiment of a mechanical linkage for operating the belt assemblies constructed in accordance with the principles of the present invention.

Three embodiments of a mechanical linkage for operating the assemblies 11 are respectively shown in FIGS. 5, 6 and 7. Each embodiment has a linkage 26 which includes a central rotatable element 27 mounted to a support plate 25, which is a part of, or is attached to, the data reader 10. The central element 27 rotates about an axle 28 in a direction of the double curved arrow. In the embodiment of FIG. 5, the central element 27 has teeth 29 thereon, which engage teeth 30, in the form of a rack, carried on a displaceable block 31. The displaceable block 31 has an internally threaded bore 32, in which a threaded rod 33 is received. The threaded rod 33 is rotatable as indicated by the curved double arrow, thereby causing the block 31 to move in one of the directions of the straight double arrow, depending on the direction of rotation of the threaded rod 33. This movement in turn causes the central element 27 to rotate around the axle 28 in a direction also determined by the direction of rotation of the threaded rod 33.

In each of the embodiments of FIGS. 5, 6 and 7, the central element 27 has arms 34 and 35 attached thereto and extending therefrom at opposite sides, each arm 34 and 35 having a free end which is attached to the plate 18 of each assembly 11 at a pivot pin 36. As the block 31 is displaced, for example, toward the right in FIG. 5, this will cause the central element 27 to rotate in a clockwise direction around the axle 28, thereby moving the arm 34 to the left of the drawing in FIG. 5, and moving the arm 35 to the right. Each assembly 11 is mounted to the support plate 25 for rotation around an axle 37, which also forms the axle for each wheel 19. The aforementioned movement of the arm 34 to the left and the movement of arm 35 to the right thus cause the assemblies 11 to move toward the tape cartridge 22.

When the displaceable block 31 is caused by a reversal in the rotational direction of the threaded rod 33 to move in the opposite direction, toward the left in FIG. 5, this causes the central element 27 to rotate in counter-clockwise direction, thereby moving the arm 34 toward the right of FIG. 5 and moving the arm 35 toward the left, causing the belts 12 of the assemblies 11 to be retracted from the tape cartridge 22.

Each arm 34 and 35 has an articulation therein connecting that arm to the central element 27. In the embodiments of FIGS. 5, 6 and 7, this articulation is formed by a region 38 of reduced width. In order to impart sufficient flexibility to this articulation, the central element 37 and the arms 34 and 35, or at least the regions 38 thereof, consist of plastic or other suitably flexible material.

The embodiment of FIG. 6 conforms to the embodiment of FIG. 5 except the manner by which the central element 27 is caused to rotate around the axle 28. In the embodiment of FIG. 6, this is accomplished by a projection 39 carried on the central element 27, which extends into the path of movement of the displaceable block 31. The projection 39 is thus abutted by the displaceable block 31 as it moves toward the left in FIG. 6. Since there is not a permanent mechanical connection between the block 31 and the projection 39, the linkage 26 can be spring biased toward one or the other extreme position (with the displaceable block 31 being disposed at the side of the projection 39 so as to exert a force opposite the force of the spring bias). Such a spring bias can be achieved, for example, by a leaf or spiral spring disposed beneath the central element 27, with one end fixed to the support plate 25 and the other end attached to the central element 27, or a similar spring arrangement can be disposed at each of the assemblies 11.

In the embodiment of FIG. 7, rotation of the central element 27 is effected by a toothed wheel 40, rotatably mounted on the support plate 25, and disposed between teeth 29 on the rotatable element 27 and teeth 30 in the form of a rack on the displaceable block 31.

The elements surrounding and supporting the displaceable block 31 within the data reader 10 are shown in FIGS. 8 and 9. The threaded rod 33 is rotated by a motor 47 against the force of a spring 44 connected between a post 50 on the displaceable block 31 and a post 45 on a plate 48 which is a part of the head movement mechanics 53 (FIG. 9) for moving the write/read head 52 toward and away from a tape in a tape cartridge which has been inserted in the data reader 10. The operation and structure of the head movement mechanics 53 do not form a part of the present invention, and thus need not be described in detail, other than the fact that the plate 48 is rotated, to actuate other elements in the mechanics 53, around an axle 51, by means of the spring 44 connected to the displaceable block 31, as the displaceable block 31 is moved by rotation of the threaded rod 33.

The displaceable block 31 is also mounted for cooperation with a cartridge lock assembly 41, which includes a plate 42 carrying three rollers 43 thereon. As described below, at a certain point in the movement of the displaceable block 31, the assembly 41 is shifted toward a tape cartridge in the data reader 10, causing the rollers 43 to come into contact with the tape cartridge, and forming a fixed, three-point reference system for the cartridge. Again, the details of the cartridge lock assembly 41, except to the extent they interact with the displaceable block 31, do not form a part of the present invention and may be as described in the aforementioned U.S. Pat. No. 4,489,355. In that patent, the mechanics are operated by a lever movable between two positions, and that lever can thus be replaced by the displaceable block 31 for actuating the mechanics.

As can be seen in FIGS. 8 and 9, the displaceable block 31 rides on a recess or shelf 49 which surrounds an opening in the support plate 25, in which the displaceable block 31 moves. The cartridge lock assembly 41 includes an inclined element 50, which causes the assembly 41 to move in a direction perpendicular to the direction of movement of the displaceable block 31, as described in more detail below.

Figure 14:
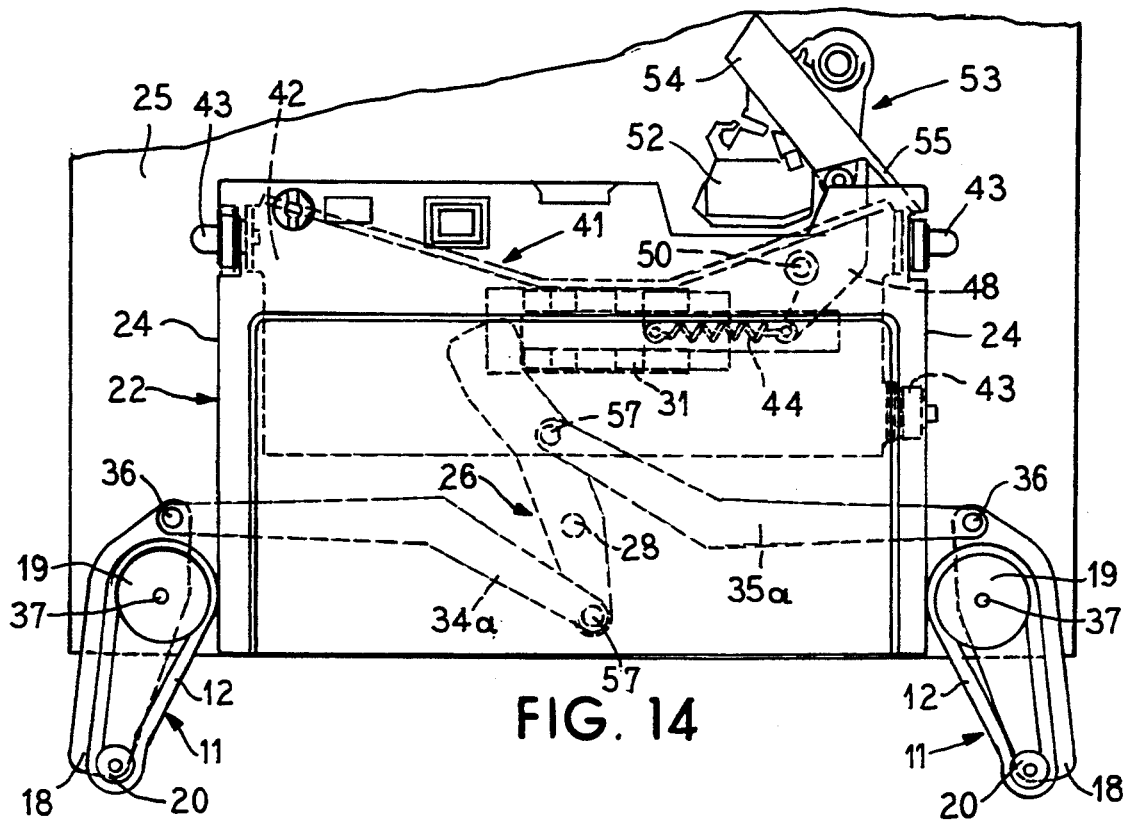

A loading sequence showing a fourth embodiment of the mechanical linkage 26, and the interaction of the displaceable block 31 with the cartridge lock assembly 41 and the head movement mechanics 53 is shown in FIGS. 10 through 15. The fourth embodiment of the mechanical linkage 26 shown in that sequence differs from the previously-described embodiments only by virtue of a modification of the shape of the components, but the operation is identical. As shown in FIGS. 10, 12 and 14, the mechanical linkage 26 has a central element 27a, again pivotable around the axle 28, which is elongated and has one end which abuts the displaceable block 31 and an opposite end to which the arm 34a is connected. The arm 35a is connected at a location between the axle 28 and the end of the central element 27a which abuts the displaceable block 31. The arms 34a and 35a are connected to the central element 27a by pivot pins 57, which provide the necessary articulation instead of the regions 38 of reduced width in the previous embodiments. The arms 34a and 35a are angled in a complimentary fashion to effect the aforementioned rotation of the assemblies 11.

The loading sequence is as follows, with FIGS. 11, 13 and 15 respectively being views as seen from above of the stages of the sequence shown in FIGS. 10, 12 and 14, but showing only those components necessary to explain the movement of the cartridge lock assembly 41 relative to the cartridge 22, with other components being omitted for clarity.

In the stage shown in FIGS. 10 and 11, the assemblies 11 have already been moved into engagement with the cartridge 22, as described above. The cartridge has a dust cover door 54 which is spring biased to normally close an opening in the top of the cartridge 22, behind which the magnetic tape is disposed. The dust cover door 54 has a flap 55 attached thereto pivotable around an axle 56. Elements (not shown) disposed in the data reader 10 engage the end of the flap 55 between the axle 56 and the closest lateral edge 24 of the cartridge 22 so as to pivot the flap 55 around the axle 56, thereby opening the door 54 and exposing the tape therebehind, as the cartridge 22 is moved upwardly into the data reader 10.

As shown in FIG. 12, the belts 12 of the assemblies 11 have been operated to move the cartridge 22 upwardly, and the dust cover door 54 is shown in an open position, with the write/read head 52 being positioned so as to be movable against the magnetic tape (not shown) in the cartridge 22 by the mechanics 53. Between the stages shown in FIGS. 10 and 12, the displaceable block 31 has not been displaced, and therefore the linkage 26 is unchanged, other than rotation of the belts 12. As shown in FIGS. 11 and 13, the element 31 has an opening bordered on opposite sides by projections 59a and 59b, through which the inclined element 50, which is a part of the plate 42, extends. Each projection 59a and 59b has a free end which is inclined parallel to the inclined element 50. Since the displaceable block 31 has not changed in position between the stages of FIGS. 10 and 11, and FIGS. 12 and 13, the inclined element 50 remains against the projection 59a.

Figure 15:
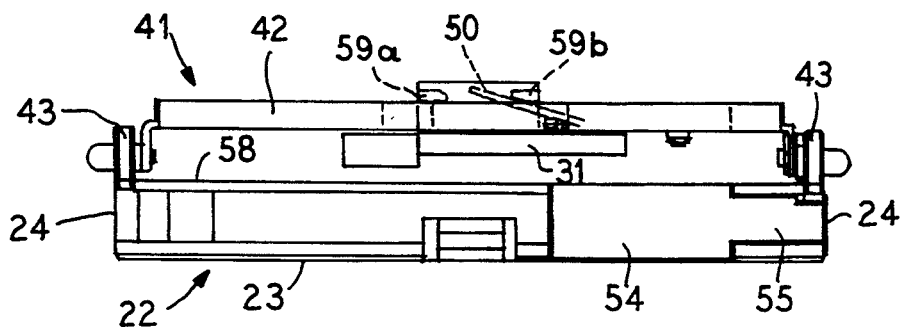

In the next stage shown in FIGS. 14 and 15, the threaded rod 33 is again caused to rotate, thereby further displacing the displaceable element 31. As shown in FIG. 15, this causes the inclined element 50 to move against the projection 59b which, due to the inclined surface thereof, rides on the inclined element 50 and pulls the assembly 41 toward the cartridge 22, so that the rollers 43 engage the cartridge 22 at appropriate locations. Simultaneously, the further displacement of the displaceable element 31 extends the spring 44, causing the plate 48 to pivot around the axle 50, thereby actuating the head movement mechanics 53 to move the write/read head 52 into a position adjacent the magnetic tape in the cartridge 22. The movement of the displaceable element 31 also operates the mechanical linkage 26 to disengage the assemblies 11 from the lateral sides 24 of the cartridge 22, except for minimal contact with the belt 12.

When the cartridge 22 is to be ejected from the data reader 10, and returned to the magazine 7, the sequence shown in FIGS. 10 through 15 takes place in reverse.

Although modifications and changes may be suggested by those skilled in the art, it is the intention of the inventors to embody within the patent warranted hereon all changes and modifications as reasonably and properly come within the scope of their contribution to the art.

We claim as our invention:

1. A loader for use with data carriers having front and rear faces and lateral sides, said loader comprising:
    a housing;
    means for inserting a plurality of upright data carriers, disposed face-to-face, into a region of said housing with at least a portion of said lateral sides of each data carrier being exposed in said region;
    a data reader movably supported in said housing above said region;
    drive means for moving said data reader over said region to a location above a selected data carrier to be transferred between said region and said data reader;
    two transfer assemblies carried on said data reader disposed for respectively engaging said exposed lateral sides of a data carrier over which said data reader is located, each transfer assembly including first and second wheels with an elastic belt entrained around said wheels, and one wheel in each said assembly being driveable in opposite directions for moving the respective belts of said assemblies to lift a data carrier from said region into said data reader and to return a data carrier from said data reader to said region;
    mechanical reciprocal linkage means connected to both of said transfer assemblies for rotating said assemblies toward and away from said respective lateral sides of a data carrier over which said data reader is located, said linkage means including a central element rotatable in opposite directions and two arms extending from said central rotatable element respectively attached to said transfer assemblies;
    an internally threaded element engaging said central rotatable element;
    a threaded rod engaging said internally threaded element; and
    means for rotating said threaded rod in a selected rotational direction to displace said internally threaded element to rotate said central element in a direction determined by the selected rotational direction of said threaded rod.

2. A loader as claimed in claim 1 wherein said means for inserting a plurality of data carriers into a region of said housing comprises means for inserting a plurality of magnetic tape cartridges, as said data carriers, into said region of said housing, and wherein said respective belts of said two transfer assemblies are adapted for frictionally engaging lateral sides of a magnetic tape cartridge.

3. A loader as claimed in claim 1 wherein said central rotatable element of said linkage means has a plurality of teeth thereon, and wherein said internally threaded element has a row of teeth thereon forming a rack, said rack engaging said teeth of said central rotatable element.

4. A loader as claimed in claim 1 wherein said internally threaded element is moved by said threaded rod along a displacement path, and wherein said central rotatable element has a projection thereon extending into said displacement path with said internally threaded element being movable along said path into abutment with said projection for rotating said rotatable element.

5. A loader as claimed in claim 1 wherein said linkage means includes a toothed wheel disposed between said central rotatable element and said internally threaded element, and further comprising a plurality of teeth on said central rotatable element engaging said toothed wheel and a row of teeth forming a rack on said internally threaded element engaging said toothed wheel.

6. A loader as claimed in claim 1 further comprising means connecting said two arms to said central rotatable element for articulating said arms relative to said central rotatable element.

7. A loader as claimed in claim 6 wherein said means for articulating comprises a region of each of said two arms of reduced width, said region consisting of flexible material.

8. A loader as claimed in claim 6 wherein said means for articulating comprises a pin connecting each arm to said central rotatable element.

9. A loader as claimed in claim 1 for use with data carriers in the form of magnetic tape cartridges, and for use with a write/read head disposed in said data reader and means for positioning said write/read head relative to a tape cartridge disposed in said data reader, and said loader further comprising means carried on said internally threaded element for actuating said means for positioning said write/read head.

10. A loader as claimed in claim 1 for use with data carriers in the form of magnetic tape cartridges, and for use with means for locking a tape cartridge in said data reader, and said loader further comprising means carried on said internally threaded element for actuating said means for locking.

* * * * *